Nov. 4, 1958 W. MEYER 2,859,348

FREQUENCY SELECTOR

Filed April 12, 1955 4 Sheets-Sheet 1

INVENTOR.
WALTER MEYER

BY

Ostrolenk & Faber
ATTORNEYS

Nov. 4, 1958 W. MEYER 2,859,348

FREQUENCY SELECTOR

Filed April 12, 1955 4 Sheets-Sheet 2

INVENTOR.
WALTER MEYER

BY

Ostrolenk & Faber
ATTORNEYS

INVENTOR.
WALTER MEYER
By Ostrolenk & Faber
ATTORNEYS

Nov. 4, 1958 W. MEYER 2,859,348

FREQUENCY SELECTOR

Filed April 12, 1955 4 Sheets-Sheet 4

INVENTOR.
WALTER MEYER

BY

Ostrolenk & Faber
ATTORNEYS

United States Patent Office 2,859,348

Patented Nov. 4, 1958

2,859,348

FREQUENCY SELECTOR

Walter Meyer, Covina, Calif., assignor to Standard Coil Products Co., Inc., Los Angeles, Calif., a corporation of Illinois Application April 12, 1955, Serial No. 500,816

7 Claims. (Cl. 250—40)

Figure 1:
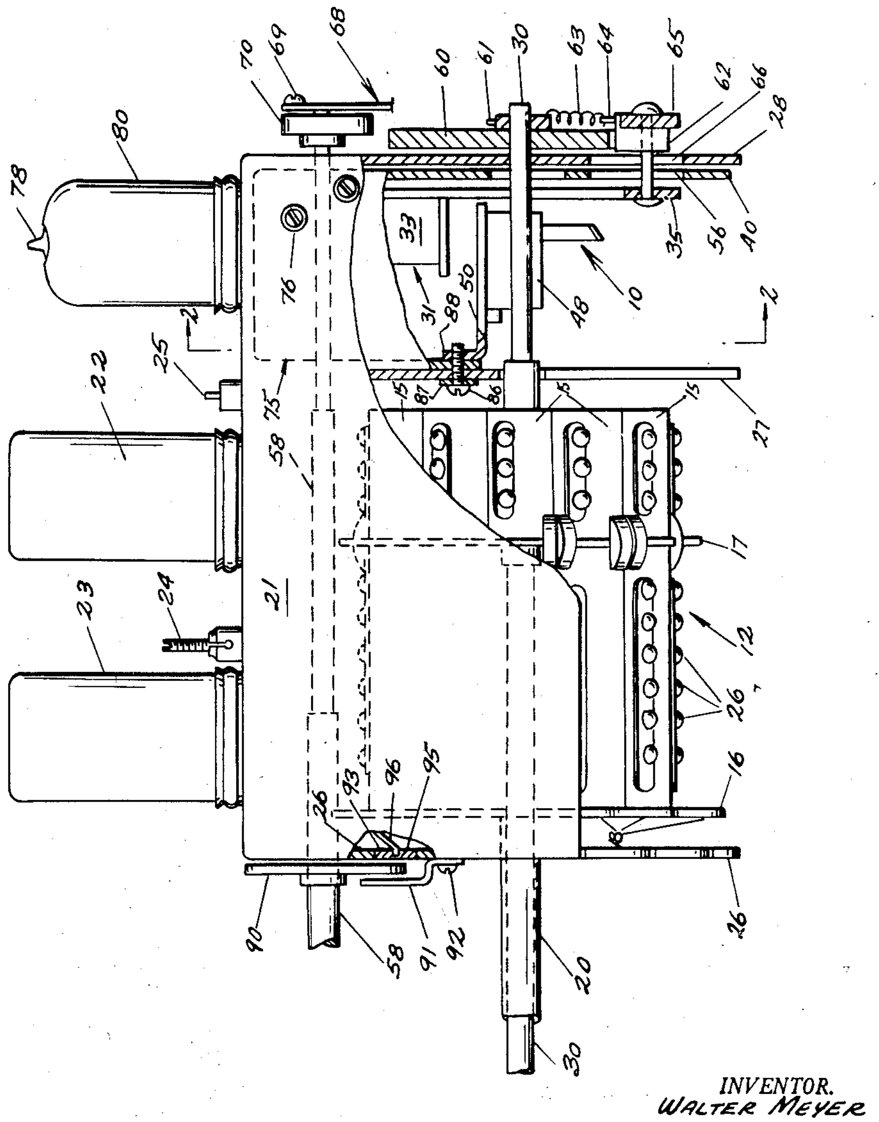

The present invention relates to a frequency selector, and more particularly to a frequency selector or turner for reception of television signals through the ultra high frequency band. For many years, television broadcasting was limited to the very high frequency range, namely the V. H. F. range comprising twelve channels, numbered 2 to 13. During this era, tens of millions of television sets were manufactured with V. H. F. 12 channel tuners. Such V. H. F. tuners or frequency selectors were manufactured as a unit separate from the main television chassis, and were made in a standard dimensional housing, namely as to axial length and cross-sectional area.

When the Federal Communications Commission recently authorized and established the ultra high frequency band of television broadcasting, it provided 70 additional channels of 6 megacycles band width, extending continuously from 470 to 890 megacycles, namely channels 14 to 83. Substantial activity ensued to provide means for practical reception of such ultra-high frequency stations, the objective being minimum cost and with maximum simplicity of operation, comparable to V. H. F. television or radio tuning.

The present invention provides a novel combination U. H. F.–V. H. F. tuner, which is relatively simple and inexpensive of components and construction; and can be manufactured in a standard V. H. F. housing as to axial length and cross-sectional area. The novel tuner of the present invention further provides simplicity of operation by affording merely two co-axial shafts, and corresponding dials, for either U. H. F. or V. H. F. station selection; and a single shaft operating the vernier or fine tuning sections of both the V. H. F. and U. H. F. bands, as either is engaged for reception.

Accordingly, an object of the present invention is to provide a novel combination U. H. F.–V. H. F. tuner of simple and compact structure, affording an envelope of minimum axial length and cross-sectional area.

It is a further object of the present invention to provide a novel combination U. H. F.–V. H. F. frequency selector affording continuous, foolproof U. H. F. tuning, and vernier tuning, and automatically affording band spreading.

It is another object of the present invention to provide a novel frequency selector including U. H. F. tuning means, affording frequency selection that is substantially linear with respect to angular tuning displacement.

It is a further object of the present invention to provide a novel combination U. H. F.–V. H. F. tuner having a single vernier tuning shaft that tunes both the U. H. F. and V. H. F. sections of the tuner in a positive relationship.

It is another object of the present invention to provide a frequency selector incorporating variable tuning means, having novel provision for compensating displacements thereof to afford a resultant linear frequency effect over the tuning range thereof.

The foregoing and further objects of this invention will become apparent in the following description taken in connection with the drawings, in which:

Figure 1 is a side view of a preferred embodiment of a combination V. H. F.–U. H. F. tuner of the present invention, partially broken away to show interior portions thereof.

Figure 2:
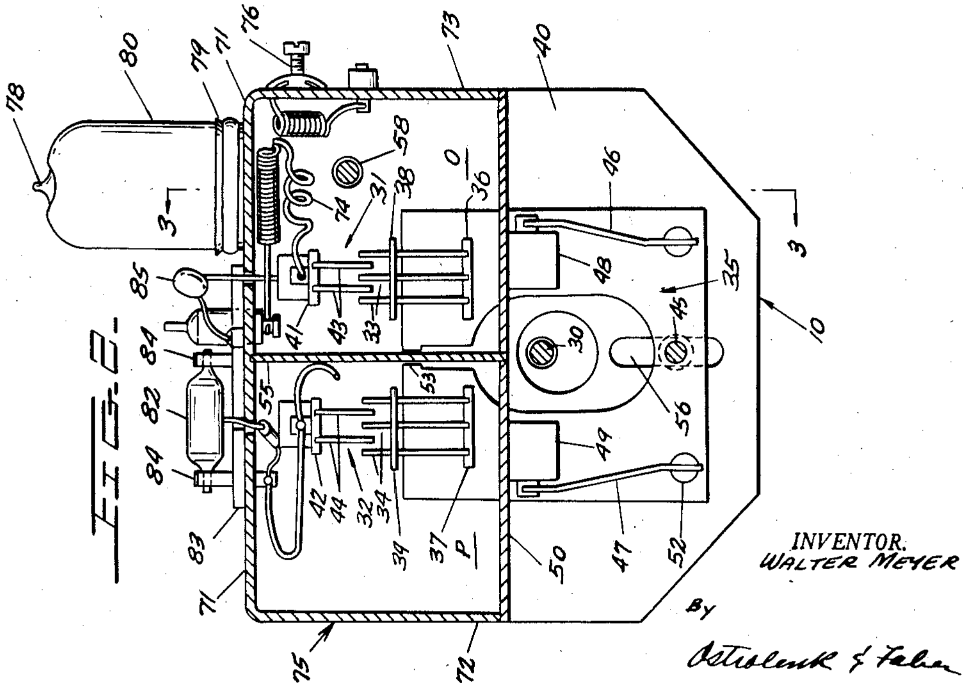

Figure 2 is a vertical cross-sectional view through the U. H. F. portion of the tuner, taken along line 2—2 of Figure 1.

Figure 3:
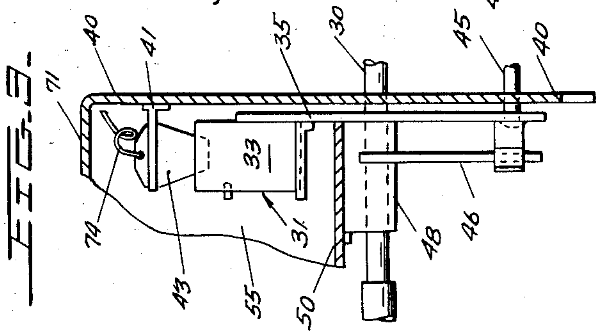

Figure 3 is an end cross-sectional view through the U. H. F. section of the tuner, taken along line 3—3 of Figure 2.

Figure 4:
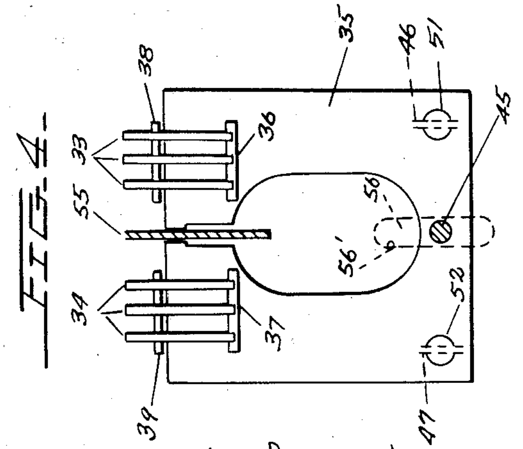

Figure 4 is a plan view of the movable condenser plate assembly of the U. H. F. tuner section of Figures 1, 2 and 3.

Figures 5, 6, 7, 7A:
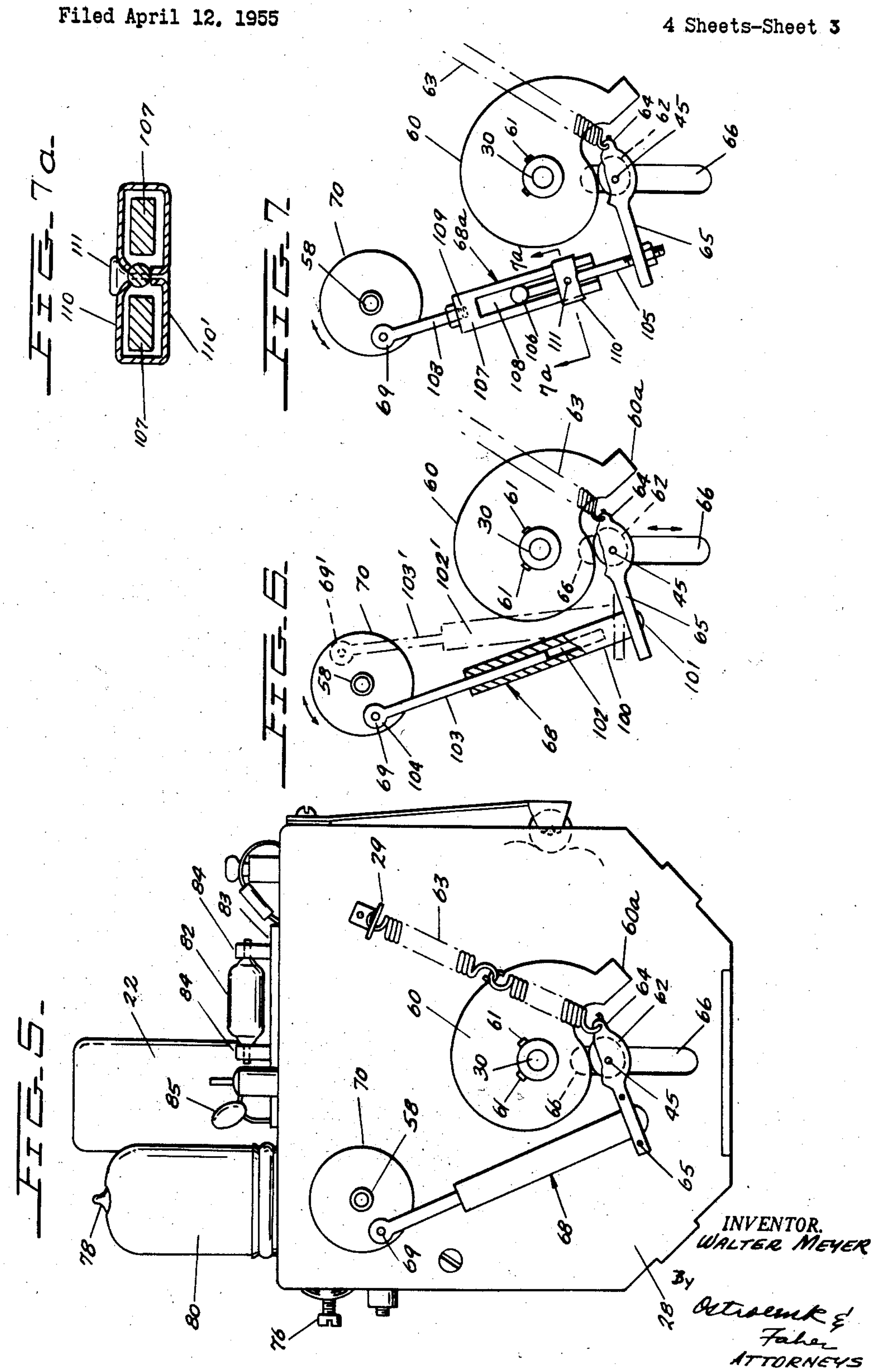

Figure 5 is an end view of the tuner embodiment of Figure 1 showing the U. H. F. tuning linkage mechanism.

Figure 6 is an enlarged, partially sectioned view of the cam linkage arrangement as shown in Figure 5.

Figure 8:
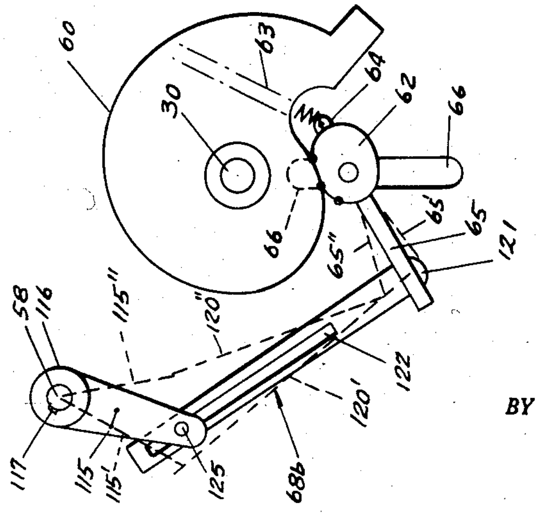

Figures 7, 7A, and 8 are modifications of the cam linkage mechanism corresponding to that shown in Figure 6.

Figure 10:
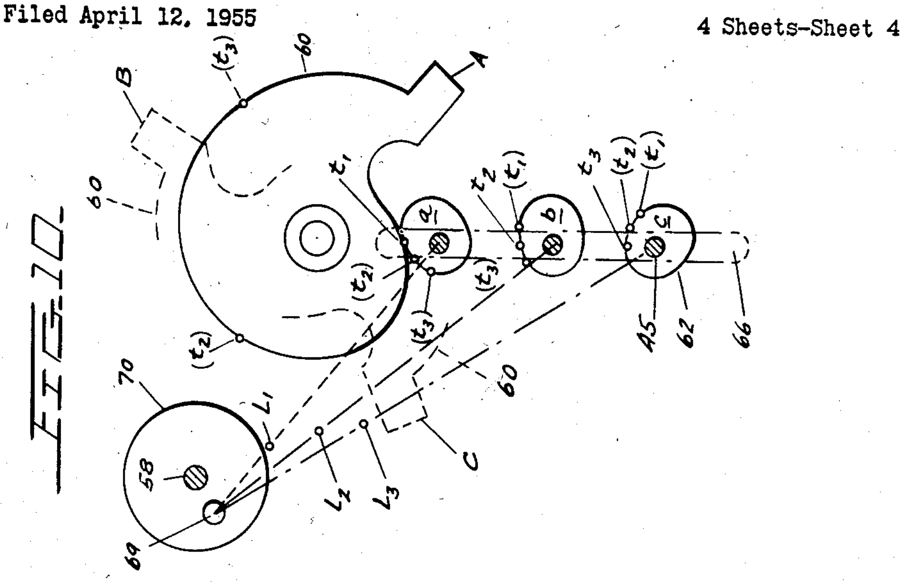
Figure 9:
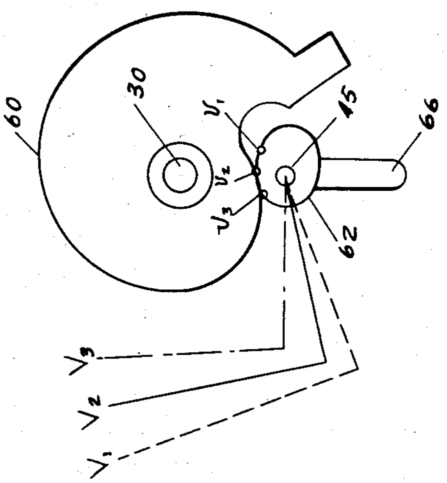

Figures 9 and 10 are diagrammatic representations of the several coactions of the cam and linkage mechanism of the present invention.

Reference is made to Figure 1, wherein the U. H. F. tuning section 10 of the combination tuner is incorporated at the far end of V. H. F. turret tuner section 12. The turret section 12, shown in the embodiment of Figure 1 is similar to that described in detail in co-pending application Serial Number 501,919, filed on April 18, 1955, assigned to the assignee of the present invention, reference being made there for operational details thereof. A feature of turret tuner 12 is the short length of its tuning strips or panels 15; and their being mounted between two metallic discs 16, 17. Disc 16 has notches 18 that co-act with a spring biased roller 19 (see Fig. 5) whereby turret section 12 is held in discreet tuning positions. Both discs 16 and 17 are secured to the tuning shaft of the V. H. F. turret, comprising sleeve 20 of the embodiment illustrated herein. The tuning strips of panels 15 comprise various circuit elements and coils that discreetly co-act with the fixed circuitry of the V. H. F. section of the tuner, in a manner heretofore established in the art, and as set forth in detail in the hereinabove referred to co-pending application. The stationary V. H. F. circuitry is mounted on and wired in the chassis 21 of the tuner, and includes electronic tubes 22 and 23; mounted within tube shields; variable inductance 24; and variable capacitor 25.

Tuning panels 15 contain axially arranged contact buttons 26, circuitally connected to the coil and circuit elements mounted interiorly of the panels 15. Manual rotation of V. H. F. tuning shaft 20 selectively moves panels 15 into electrical engagement with sliding contacts of the fixed V. H. F. circuitry of the tuner, and thereby provides reception of any of the twelve V. H. F. channels in accordance with each corresponding panel 15. Details of the V. H. F. turret 12, panels 15, and circuitry of the V. H. F. tuner, not being particularly claimed features of the present invention, are shown merely by way of preferred illustration, and not detailed herein.

The channel strips or panels 15 of Figure 1 are of a unitary structure, being set into place between slots in side disc 16, and flexible lips protruding from disc 17. Such construction of panels 15 permits a substantial foreshortening of the axial length of the V. H. F. tuner structure 12, as set forth in the aforesaid co-pending application. As shown in Figure 1, turret or drum 12 is mounted on sleeve 20 and between frame front plate 26, and barrier plate or shield 27, secured to the tuner chassis 21.

An important feature of the present invention is to provide a novel U. H. F.–V. H. F. combination tuner or frequency selector covering all the assigned 82 television channels, which tuner is completely housed in a unitary tuner chassis having its longitudinal or axial dimension, as well as its cross-sectional dimension of the order of the corresponding dimensions of the V. H. F.-only tuners of the prior art. With the tuner of the present invention, it is accordingly readily feasible to provide full 82 channel reception of television signals, with an overall television chasis and set size no different than that for V. H. F.-only. The same television receiver may alternately use a V. H. F.-only or a combination U. H. F.–V. H. F. tuner of the present invention, using the same tuner well size of the receiver. Furthermore, since the control shaft and knob structure for the present invention is as simple as that for V. H. F.-only tuners, the tuner of the present invention lends itself readily for conversion of V. H. F.-only television receivers, to combination 82 channel V. H. F.–U. H. F. reception, since the overall dimensions of the invention tuner permit it to readily replace a prior V. H. F. tuner electrically and structurally in the television chassis.

The U. H. F. tuner section 10 of the invention tuner is manually operated through front end shaft 30 that extends through V. H. F. turret sleeve 20, and through the tuner chassis end plate 28. The present invention provides a simple, effective, novel linear U. H. F. tuning arrangement, together with a novel vernier fine tuning arrangement, that permits ready selection of specific U. H. F. channels, as will be described in more detail.

The preferred embodiment of U. H. F. tuner 10 incorporates condenser tuning, comprising condensers 31 and 32 (see Figure 2). The grounded "movable" plates 33, 34 of condensers 31, 32 are rigidly mounted to movable plate member on platform 35, as seen in Figure 1 through Figure 4. Condenser plates 33 are set into projecting support 36 in turn secured to member 35; and plates 34, into projecting support 37 on member 35. Crossbars 38, 39 are secured to plates 33, 34 respectively at an intermediate position to further rigidly hold them against possible vibration during signal reception. For stability, it is important to prevent vibration of any of the condenser plates in the U. H. F. section, and accordingly, sturdy condenser plates are used with reinforced mountings. The "fixed" U. H. F. condenser plates 43, 44 of condensers 31, 32 are mounted in insulated supports 41 and 42 respectively. Supports 41, 42 are secured to U. H. F. chassis section end plate 40.

Movable platform 35 is operable, in the illustrated embodiment, in a vertical direction through pin 45, in a manner to be thoroughly set forth hereinafter. Member 35 is constrained in a predetermined linear path without backlash, as follows: Leaf springs 46 and 47 extend from mounts 48, 49 secured to U. H. F. chassis bottom plate 50. Leaf springs 46, 47 extend slideably through slots in posts 51, 52 that are secured to the corners of platform member 35. Leaf springs 46, 47 coact with member 35 spring-biasing it in one direction. Thus, for example, in the illustrated embodiment lip 53 of member 35 is pressed (to the right, in Figure 2) against central barrier plate or shield 55 of the U. H. F. unit assembly. Thus, in its vertical up and down movement, platform 35 is maintained in a predetermined backlash-free track, as a result of the sliding coaction between its lip 53 and vertical plate 55. Similarly, and with the same result, pin 45, secured to platform member 35, and extending therefrom through vertical slot 56 of chassis plate 40, is pressed against its right side 56' of the herein disclosed version. Accordingly, the spring biasing of the condenser carrying plate member 35, throughout its vertical up and down travel against the two areas of contact 53—55 and 45—56', serves to constrain the corresponding motion of the movable condenser plates 31, 32 linearly with respect to their fixed plates 43, 44. The reproducible displacements of plate member 35 result in predetermined coaction of the movable and fixed plates of the U. H. F. condensers 31, 32.

The displacement of condensers 31, and 32, in turn, result in the U. H. F. frequency selection of the tuner assembly, in a manner to be further detailed herein. Such displacement of the movable members of the U. H. F. condensers 31, 32 are, for a given structure of the embodiment, manually controllable by a dial attached to control shaft 30 normally extending to the front of the television cabinet. The U. H. F. channels 14 through 82 are "tuned in" through the U. H. F. tuner basically by the rotation of the U. H. F. control knob 30; with a vernier U. H. F. tuning override arrangement effected through vernier control shaft 58, extending through the tuner and to a vernier knob (not shown) mounted at the front of the television cabinet.

In accordance with the present invention, a novel, simple and very effective arrangement is provided for the "tuning in" of the U. H. F. channel frequencies, in a continuous manner, and with basic frequency angular linearity, through U. H. F. control shaft 30 and "band spread" vernier tuning by shaft 58. Control shaft 30 extends through the rear end of the tuner chassis through openings in end plate 28, in which it is suitably journaled. U. H. F. cam 60 is secured to U. H. F. control shaft 30 by set screws 61. Referring now to Figures 1 and 5, U. H. F. cam 60 coacts with cammed cam follower 62 mounted on pin 45 that extends from U. H. F. movable condenser platform 35. Cam follower 62 is spring biased against cam 60 by helical spring 63. One end of spring 63 is connected to an opening in lip 64 extending from follower 62, the other end, to a lug 29 secured to chassis plate 28. Pin 45 is movable up and down with respect to plate members 28 and 40 through vertical slots 56 and 66 respectively therein.

Angular displacement of U. H. F. shaft 30 accordingly permits cam follower 62 to move in a vertical direction, in accordance with the angular position of cam 60 as determined by shaft 30. Movable platform 35 carrying the fixed U. H. F. condenser plates 33, 43 is accordingly displaced in a positive and direct manner with respect to fixed condenser plates 33, 34 through shaft 30. The relative displacement of U. H. F. condenser plates 31, 32 determines the frequency or U. H. F. channel selected by the tuner and converted and fed into the intermediate frequency amplifier section of the television chassis.

Vernier tuning through shaft 58 superimposes a fine tuning action translated into small vertical displacements of U. H. F. condenser plates 31, 32 through a mechanical linkage arrangement coupled to arm 65 extending from cam follower 62, through a linkage mechanism 68. One end of linkage 68 is connected to pin 69 eccentrically mounted in disc 70 secured to vernier shaft 58. Further details of both the U. H. F. tuning action through control shaft 30 and cam 60, and the U. H. F. fine tuning action through vernier shaft 58 and linkage 68 operating on cammed cam follower 62, will be set forth hereinafter.

It is to be noted that the U. H. F. tuner section 10 is illustrated constructed as a separable sub-chassis unit. As may be seen from Figures 1 and 2, the U. H. F. unit 10 comprises sub-chassis 75, made up of metallic end plate 40 and two boxed-in sections made up of horizontal bottom plate 50, top U. H. F. chassis plate 71, sides 72 and 73, and vertical central shield or barrier plate 55. As is well known in the tuner art plates 40, 50, 55, 71, 72 and 73, are of a conductive metallic material.

Plates 40, 50, 55, 71 and 73 form a 5-side boxed-in shielded enclosure for the U. H. F. oscillator section O, comprising variable condenser 31, inductance coil 74, trimmer condenser 76 and associated electronic components, as will be understood by those skilled in the art. A U. H. F. triode oscillator vacuum tube 78 is mounted in socket 79 extending from chassis plate 71, and shielded by tube shield 80.

Similarly, plates 40, 50, 55, 71 and 72 form a 5-sided boxed-in shield containing the U. H. F. tunable preselector P, comprising circuit elements including variable condenser 32, inductance loop 81 and associated circuit elements not detailed herein, and understood by those skilled in the art. A crystal diode 82 of the clip-on type is shown on top chassis plate 71 mounted in insulating holder 83 between clips 84, 84 thereof. Connections between circuit elements between oscillator section O, preselector section P, and components on top panel 71, including vacuum tube 78, mixer crystal 82, disc capacitor 85, etc. are made in a manner known to those skilled in the art, through openings in the respective plates 55 and 71.

The U. H. F. tuner unit 10 is mountable within the basic tuner chassis 21 between its end plate 28 and barrier or shield plate 27, as more particularly shown in Figure 1. Plate 50 is attachable to barrier plate 27, as for example, through self-tapping screws 86 and lock washers 87, coacting with lugs 88 extending from U. H. F. plate 50. Similar fastening means may be used to secure other portions of U. H. F. chassis unit 75 to tuner chassis 21 in the indicated position. Suitable openings are provided on the top of chassis 21 for U. H. F. oscillator tube 78, mixer crystal 82 and other components to project through above the tuner, as shown in Figure 1. It will thus be seen that the securing of U. H. F. sub-chassis 75 into tuner chassis 21, between plates 27 and 28 thereof, provides the sixth side for the two 5-sided shielded boxes (for U. H. F. oscillator section O and preselector section P), and fully shielding these two U. H. F. sections to afford maximum circuit stability and efficiency.

Thus, U. H. F. unit 10 may be manufactured as a subassembly, pre-tested before insertion in the main tuner, and, where necessary in future service, readily taken out and repaired or replaced at a minimum cost. While particular electrical circuits of the tuner as a whole form no part of the present invention, reference is made to co-pending application Serial No. 450,010, filed August 16, 1954, assigned to the assignee of the present invention, for preferred electrical-electronic arrangements for the tuner set forth herein.

As fully described in the latter co-pending application, the V. H. F. turret tuner corresponding to unit 12 of Figure 1 herein has 13 positions and sets of panels therefor; twelve of which discretely tune each of the 12 channels of the V. H. F. band. The remaining or thirteenth tuning panel contains U. H. F. circuitry converting the stationary V. H. F. tuner circuits to U. H. F. operation in the following manner: Normally, for the twelve V. H. F. channels, the V. H. F. panels (15) co-act circuitally with vacuum tube 22 used as a cascode R. F. amplifier and vacuum tube 23 used as a V. H. F. Colpitts-type triode oscillator and pentode mixer-converter, resulting in an output intermediate frequency of, say, 41 megacycles. As described in co-pending application Serial No. 450,010, when the operator desires to tune in U. H. F. channels, the V. H. F. control shaft, corresponding to sleeve 20 herein, is turned until the thirteenth or U. H. F. panel is in circuital position and connected to the stationary V. H. F. circuits including the tubes 22 and 23. Such U. H. F. position is plainly marked on the V. H. F. dial which is turned to a stationary index.

When sleeve 20 is thus in the "U. H. F." position, the U. H. F. panel (15) acts with the V. H. F. stationary circuits as follows: The U. H. F. panel (15) contains circuit elements that convert the cascode amplifier circuit incorporating tube 22 to an intermediate frequency amplifier for 41 megacycles. Similarly, the operation of the vacuum tube corresponding to 23 herein, is changed to safely inactivate the triode oscillator section thereof, and the pentode-mixer section previously responsive to, say, 41 megacycles, as an intermediate frequency, passes through and amplifies further the 41 megacycle signal now coming from tube 22. The overall V. H. F. circuit is accordingly transformed into a two-stage intermediate frequency amplifier in a preferred range, such as 41 megacycles, as is used in the intermediate amplifier of the television chassis itself.

The U. H. F. tuning unit 10 is circuitally designed to tunably select any U. H. F. channel from 13 to 82, and convert the selected channel signals to a said intermediate frequency range, namely 41 megacycles. Such circuits and details thereof usable in a tuner of the present invention are fully described and detailed in the aforesaid copending application Serial No. 450,010, filed August 16, 1954, and their inclusion here is not deemed necessary for a full understanding of this invention.

With reference to the U. H. F. section, as seen in Figure 2 herein, the oscillator section O is tunable by variable condensers 31 to a frequency equal to 41 megacycles above the frequency corresponding to the carrier of each of the U. H. F. channels tuned in by the preselector P. This is accomplished by proper design of the parameters, and ganging of condensers 31, 32. Correspondingly, in the single-stage preselector section P, the variable condenser 32 adjusts the frequency of its associated tuning circuits to that of any of the U. H. F. channels (13 to 82). This is accomplished by the operator through shaft 30 and a vernier shaft 58. The U. H. F. band is in the frequency range from 470 to 890 megacycles, comprising 70 channels of 6 megacycle bandwidth each. The preselected U. H. F. channel signal at section P, together with the corresponding oscillator signal from section O, are fed to the mixer-crystal 82 circuit, as also described in the aforesaid copending application, and in turn, to the successive "converted" two-stage 41 megacycle amplifier of the V. H. F. section corresponding to tubes 22 and 23 herein.

An important feature of the present invention is the provision of a single vernier tuning control for both the V. H. F. and U. H. F. bands. As set forth hereinabove, fine tuning shaft 58 extends to the rear of the combination tuner, to operate an eccentrically mounted pin 69 that displaces a linkage mechanism 68 coacting with arm 65 of cammed cam follower 62. Thus, for a given setting of basic U. H. F. cam 60, the angular displacement of cammed cam follower 62 (through the angular motion of vernier shaft 58) in turn results in a corresponding vernier linear displacement of plate member 35 and with it the movable condenser plates 33, 34. Such vernier displacement of condenser plates 33, 34 results regardless of the angular position of U. H. F. cam 60, and permits vernier U. H. F. tuning after main control shaft 30 stations U. H. F. cam 60 to the approximate desired tuning position. Further and complete details of the vernier tuning linkage (68), as well as the coaction of U. H. F. cam 60 with cammed cam follower 62, will be set forth hereinafter.

At this point the parallel V. H. F. vernier action is described. Upon vernier shaft 58 is mounted a dielectric disc 90 the circumference of which varies radially with respect to the axis of shaft 58. A metal plate 91 extends from, and is attached to, front plate 26 of tuner chassis 21 by self-tapping screw 92. Opposite plate 91 a ceramic button 93 is mounted into an opening in plate 26. Centrally of ceramic button 93 is a metallic button 95. Rotation of vernier shaft 58 causes dielectric cammed disc 90 to vary its angular position between metal plate 91, grounded to the chassis 21, and ceramic mounted metallic button 95. The variable radial extension of disc 90 between plates 91 and 95 results in a variable capacitance. This controllable vernier variable capacitance (91—90—95) is connected to the V. H. F. tuner circuit through lead 96, and utilized in a manner well known in the tuner art.

It is thus seen that a direct and positive vernier tuning action is afforded through the single vernier shaft 58, extending to the front of the television set for either V. H. F. or U. H. F. stations, and is usable, insofar as the operator is concerned, for any of the 82 television channels. When the V. H. F. section of the combination tuner is operated, the V. H. F. vernier condenser (91—90—95) is effective in its circuit and is controllable through a knob connected to the front of shaft 58; when the U. H. F. section is operated, vernier action on condensers 31, 32 is effected through linkage 68.

Referring now to Figure 5, one preferred form of linkage mechanism 68 is seen connected between pin 69 on disc 70 and arm 65 of cammed cam follower 62. As hereinabove set forth and detailed, cam follower 62 is spring-biased against the surface of U. H. F. tuning cam 60 by helical spring 63; and is constrained in a vertical or up-and-down direction through pin 45 firmly connected to follower 62, and which rides in vertical slot 66. As further described hereinabove, U. H. F. cam 60 is secured to the rear end of control shaft 30.

U. H. F. cam 60 is designed with a curvature related to the desired linear movement of the U. H. F. condenser plates 33, 34 with respect to the angular displacement of control shaft 30. The cam 60 embodiment, as seen in Figure 5, may be operated over an arc of the order of 300 to 330° as may be designed. The angular movement of cam 60 is restricted to projecting lip 60ᵃ situated between the end of its high displacement portion and start of its low displacement portion. It is now clear that the up-and-down displacement of cam follower 62 is basically controlled by the curvature of cam 60, through the manual angular displacement of shaft 30. Such displacement of cam follower 62 carries with it the movable condenser plate assembly 33, 34, 35.

The correlation of, and the physical shapes of fixed condenser plates 43, 44 with respect to the movable condenser plates 33, 34 is one important factor in the linearity of U. H. F. frequencies tuned as a result of such condenser displacement—and in turn, related to the angular displacement of U. H. F. shaft 30. An important practical aspect and result in the present invention is in obtaining substantially linear tuning of the U. H. F. channels as related to the angular displacement of tuning shaft 30. This is basically accomplished by proper shaping of the plates of the ganged U. H. F. condensers 31, 32, and the corresponding shaping of the cam surface of U. H. F. cam 60 in its action on cam follower 62. Follower 62 in turn, displaces condensers 31, 32 for the tuning through the intermediate movable platform 35. In other words, the aforesaid linear tuning permits the U. H. F. dial to have indices and numerals identifying the seventy U. H. F. channels evenly spaced along the dial circumference.

A given angular turn or displacement of cam 60, with the invention arrangement, will correspond to a given shift of frequency in the U. H. F. tuning unit. For example, where cam 60 is designed for a 315° operating range, with the present invention a U. H. F. dial attached to the front of shaft 30 will result in a linear tuning of the U. H. F. channels wherein each channel evenly represents 4.5° along the dial. Thus, tuning of U. H. F. channels, herein, is as simple as ordinary radio broadcast tuning of present day radios. The present invention provides further novel means of vernier tuning used in conjunction with the herein described linear tuning arrangement to afford even more practical U. H. F. tuning control to the operator. The details and features of the vernier U. H. F. tuning arrangement operative through cammed cam follower 62 by vernier shaft 58 and the linkage mechanism 68 now follow.

Figure 6 is an enlarged view of the vernier cam linkage mechanism 68 seen in Figure 5. Linkage mechanism 68 connects to arm 65 extending from cam follower 62 and to eccentric pin 69 on vernier disc 70. Mechanism 68 is one embodiment, comprising a cylinder 100 suitably secured to arm 65 in a manner such as by fastening screw 101. Cylinder 100 has a central bore 102 slidably coactible with cylindrical rod 103 containing an ear 104 at its outer end. It is desirable to utilize light grease or graphite to minimize friction in the coaction of elements 100, 103 in opening 102. Rod 103 is pivotally secured to vernier disc 70 through pin 69, engaging its ear 104 to the off-center or eccentric pin 69 on disc 70. Rotation of vernier disc 70, through vernier shaft 58, shifts the physical position of pin 69 such as to the position 69' shown in dotted lines. The vernier tuning accordingly displaces rod 103 to position 103'.

Since rod 103 coacts with a substantial linear position of cylinder 100, it can attain position 103' only when the correlated motion of cylinder 100 occurs to position 100', and correspondingly, the angular position of cam 62 moves so that its arm 65 reaches position 65', indicated in dotted lines. Biasing spring 63 attached to ear 64 extending from cam follower 62, continually presses the cammed surface of follower 62 against the cam surface of cam 60, and at the same time, permits the slideable coaction of cylinder 100 rigidly connected to an arm of follower 62, with the pivotally mounted pin 103.

It will now be clear that an angular displacement of rod 103, due to vernier tuning or angular displacement of shaft 58, can only occur in coaction with a corresponding angular displacement of cylinder 100, and a further and also corresponding angular shifting of cam follower 62 on its pivotal pin 45. Such inter-related coaction and resultant angular shifting of cam follower 62 as a result of the vernier tuning displacement of shaft 58 is an important feature of the present invention. Several equivalent physical embodiments may be designed to afford the desired results. Figures 7 and 8 illustrate two of the modifications of suitable linkage mechanisms between vernier shaft 58 and cam follower 62 to accomplish the same results. The inter-relationship and action of cam follower 62 to accomplish important results in the present invention are detailed hereinafter in diagrammatic Figures 9 and 10.

Figure 7 is an end view of linkage mechanism 68ᵃ for the vernier tuning arrangement, and corresponds to the modification for mechanism 68 heretofore described. Linkage mechanism 68ᵃ accomplishes functionally the same results as that of mechanism 68. A rod 105 is firmly secured to the end of arm 65 integral with cam follower 62. At the far end of rod 105 is secured a metallic sphere 106, such as a steel ball. Steel ball 106 coacts with a member 107 having an interior channel 108 longitudinally thereof. Channeled member 107 is pivotally secured to pin 69 of vernier disc 70 through pin 108 suitably secured by fastening means 109 to channeled member 107. A slideable wing nut 110 is secured to an intermediate position on rod 105 by a cotter pin 111 extending through a hole in rod 105.

Reference is made to Figure 7A wherein an additional wingnut 110' will be seen on the opposite side. Wing nuts 110, 110' conform closely to the arms of channel member 107 and are slideable thereon. The purpose of wings 110, 110' is to constrain the coaction of rod 105 with respect to member 107 so that in combination with corresponding restraining action of ball 106 in channel 108 causes a parallel coaction of members 105, 107. It will now be understood by those skilled in the art that parallel coaction described for rod 105 and channeled member 107 corresponds to that obtained between cylinder 100 and rod 103 of the mechanism 68 described above, as to linkage between eccentric pin 69 on disc 70, and arm 65 of cam follower 62.

Figure 8 illustrates mechanism 68ᵇ which is a novel linkage mechanism connecting vernier control shaft 58 to arm 65 of cam follower 62. Mechanism 68ᵇ comprises an arm 115 extending from hub 116 firmly secured such as by pin 117 on vernier shaft 58. Modification 68ᵇ dispenses with vernier disc 70 which permitted full rotation through 360° of vernier shaft 58. The currently described mechanism 68ᵇ, is constrained to an angular displacement of about 90°. Arm 115 coacts with a slotted link 120, firmly secured by fastening means such as 121 to the end of cam arm 65. Link 120 contains a central longitudinal slot 122 within which is slideable a pin 125, extending from the end of arm 115. It will now be seen that the angular displacement of shaft 58, albeit through a positive swing of only about 90°, directly effects a substantial angular swing of link member 120 as follows:

Link 120, being mechanically secured to cam follower 62, is spring biased therewith through the helical spring 63 and with an upward spring biasing force component. Since link member 120 is cojoined through pin 125, slideably in its longitudinal slot 120 to arm 115, link 120 adjusts itself to an angular position directly related to and dependent upon the angular position of shaft 58 and extending arm 115. Dotted lines 120′ and 65′ indicate the position of link 120 and arm 65 when vernier arm 115 is displaced to position 115′. It will be seen that the linkage 120—65 is constrained to the 120′—65′ position due to the aforesaid action.

Correspondingly, when vernier arm 115 is displaced to the opposite direction, namely to position 115″, the coacting linkage is shifted to position indicated and detailed herein as 120″—65″. The angular position of cam follower 62 is thus directly changed by the rotation of vernier shaft 58 for the beneficial results to be described in detail in connection with Figures 9 and 10.

Figure 7 diagrammatically represents the action on cammed cam follower 62 as a result of the angular displacement of vernier tuning shaft 58 and any of the aforesaid embodiments of the present invention. Cam follower 62 presses against the surface of U. H. F. cam 60 and is movable along vertical slot 66 holding its pin 45. As heretofore described, cam follower 62 is coupled to the vernier control shaft through linkage mechanism that angularly displaces cam follower 62 on pin 45 in accordance with the angular displacement of the vernier control shaft (not shown).

Such displacement of cam follower 62 by the linkage mechanism is indicated by the three angularly representative positions $V_1$, $V_2$ and $V_3$. The angular rotation of vernier tuning shaft angularly displaces cam follower 62 on its pin 45, whereby for the indicated displaced positions $V_1$, $V_2$, $V_3$, the corresponding position of cam follower 62, $v_1$, $v_2$, $v_3$ co-acts with U. H. F. cam 60. In practical operation, U. H. F. cam 60 is adjusted close to the desired channel being tuned in through its shaft 30. U. H. F. cam 60 thereupon remains stationary and the vernier tuning shaft is angularly displaced, with the result that the surface of cam follower 62, co-acting with cam 60, is correspondingly changed. The cammed surface of follower 62 moves or otherwise vertically displaces pin 45 through cam 60, since it co-acts with a position of U. H. F. cam 60 during the vernier tuning function. In Figure 9 the surface position $v_2$ of cam follower 62 is shown co-acting with cam 60.

When vernier tuning angularly displaces follower 62 to the position corresponding to $V_1$, its surface position $v_1$ is moved into co-action with stationary cam 60 which, in the illustrated figure, is radially farther from the pin 45, and correspondingly permits pin 45 to move downward due to the action of the biasing spring force on cam follower 62. The vertical displacement of pin 45 thereupon displaces condenser platform 35, decreasing the capacitance setting of U. H. F. condensers 31, 32 and their U. H. F. tuning in a corresponding manner. Conversely, when the vernier tuning moves follower 62 to a position corresponding to $V_3$, its surface position $v_3$ radially functions from pin 45 to co-act with stationary cam 60. This results in pin 45 and condenser platform 35 moving upwardly, increasing the capacitance of ganged condensers 31, 32 in the illustrated embodiment. It will now be understood that angular displacement of vernier tuning shaft 58 correspondingly displaces the angular co-action of cammed cam follower 62 with the basic U. H. F. cam 60. The shape of the cammed surface of follower 62 is such as to afford a reasonable frequency change in the U. H. F. tuning circuits over the extent of its angular displacement by vernier shaft 58.

Another important feature of the present invention will now be described which affords further simplicity and ease of operation in the U. H. F. vernier tuning arrangement heretofore set forth as an additional feature thereof. Referring now to Figure 10, a schematic drawing represents the action of cam 60 on cam follower 62, a result of angular displacements of cam 60. Cam follower 62 is shown schematically in three successive angular relationships, *a, b, c*, coacting with U. H. F. cam 60 in three corresponding angular positions A, B, C.

In position $A_{1a}$, cams 60, 62 are tangent and co-act at position $t_1$. In position $A_a$ the linkage between pin 69 and vernier disc 70 and pin 45 of cam follower 62 is schematically indicated by the broken line $L_1$. When U. H. F. cam 60 is angularly displaced counterclockwise to position B in Figure 10, the rising cam surface pushes against spring biased cam follower 62, causing it to move downward through its pin 45 in slot 66. The linkage between pins 45 and 69 is indicated in position *b* by $L_2$, and corresponds to linkage mechanism 68 in modification hereinabove set forth. The angular position of cam follower 62 in position B, *b* is constrained to correspondingly rotate clockwise until its position $t_2$ coacts with the corresponding portion of cam 60 when in position B. In the illustration of Figure 10, the radial length of follower 62 at $t_2$, with respect to pin 45, is smaller than the corresponding radial length for cam follower position $t_1$. This results in cam follower 62 displacing condenser platform 35 to a lesser degree upon angular displacement of vernier shaft 58, in accordance with the action described with Figure 9. Furthermore, when U. H. F. cam 60 is still further displaced counter-clockwise to position C, a further radial displacement downward occurs of cam follower 62 to position *c*. Due to the constraining action of linkage mechanism indicated at $L_3$ cam follower surface $t_3$ is pressed into coaction with cam 60. In the illustrated embodiment, the radial length of $t_3$ on cam follower 62 is even less than that for position $t_2$.

When U. H. F. cam 60 is in a counter-clockwise position such as C, cam follower 62 is near its lowest vertical position, with condenser platform 35 causing the movable plates 33, 34 of U. H. F. condensers 31, 32 to be further apart. This results in a lower capacitance setting of ganged condensers 31, 32, corresponding to the higher frequency channels being tuned in by the tuner. Thus, when the vernier tuning through shaft 58 is manually operated to where U. H. F. cam 60 is in a position for receiving the higher frequency U. H. F. channels, it is desirable that the operator effect a similar frequency shifting due to the vernier tuning action on the higher U. H. F. channels as he would when vernier tuning channels having lower frequency settings.

In other words, if it is desired to have a plus or minus 2 million cycle frequency displacement, due to a given vernier tuning shaft displacement, it will be desired to have substantially such frequency displacement whether the operator is tuning-in upper channel 80, an intermediate U. H. F. channel such as 45, or a lower frequency U. H. F. channel such as 20. The amount of capacitance change needed to effectuate a 2-megacycle swing for channel 20 is more than the corresponding capacitance change required to effect a 2-megacycle swing for channel 80. In accordance with the present invention, this important feature is accomplished by suitable shaping of the cammed surface of follower 62, as will now be understood by those skilled in the art. The angular shifting of cam surface of follower 62, a result of the novel arrangement and linkage mechanism of the vernier tuning arrangement of this invention, through the displacement of the basic U. H. F. cam 60, affords the desirable "band spreading" effect on the fine tuning over the U. H. F. channel range.

The U. H. F. mechanism and tuning arrangement of the present invention result in linear tuning of the basic U. H. F. channels in a continuous manner throughout the U. H. F. band, the linear tuning being accomplished by proper shaping of the coacting plates of U. H. F. condenser 31, 32, and the proper shaping of the basic U. H. F. cam 60. Vernier tuning for the U. H. F. band is accomplished by simple, inexpensive and effective mechanism which simultaneously affords the desirable feature of band-spreading, wherein the operator has the same vernier "feel" for the vernier tuning knob regardless of the channel the vernier tuning is used on.

While the present invention has been illustrated and described in connection with preferred embodiments thereof, it is to be understood that the invention lends itself to further embodiments and modifications, and it is not intended to be limited, except as set forth in the following claims.

I claim:

1. A frequency selector comprising a plurality of variable frequency determining elements, a displaceable member suitably coupled with said elements, a tuning shaft, mechanism including a cam secured to said shaft, a vernier tuning shaft, a cam follower coactable with said cam, means secured to said cam follower and connected to said member for displacing said member in correspondence with linear displacement of said cam follower, and linkage means comprising a first portion connected to said vernier shaft, a second portion connected to said cam follower, said first and second portions being slidably coactable whereby angular displacement of said vernier shaft causes predetermined angular displacement of said cam follower affording corresponding displacement of said member effetcing vernier tuning of the said elements.

2. A frequency selector comprising a plurality of variable frequency determining elements, a displaceable member suitably coupled with said elements, a tuning shaft, mechanism including a cam secured to said shaft, a vernier tuning shaft, a cam follower with a cammed surface coactable with said cam, means secured to said cam follower and connected to said member for displacing said member in correspondence with linear displacement of said cam follower, and linkage means comprising a first linear portion having one end essentially connected to said vernier shaft, a second linear portion having one end firmly connected to said cam follower, said first and second portions being slidably coactable in a co-linear manner whereby angular displacement of said vernier shaft causes predetermined angular displacement of said cammed surface with respect to said cam affording corresponding displacement of said member effecting vernier tuning of the said elements.

3. A frequency selector comprising a plurality of variable frequency determining elements, a displaceable member suitably coupled with said elements, a tuning shaft, mechanism including a cam secured to said shaft, a vernier tuning shaft, a cam follower having a cammed surface coactable with said cam, pin means secured to said cam follower and connected to said member for displacing said member in correspondence with linear displacement of said cam follower, a spring biasing said follower against said cam, and linkage means comprising a first linear portion having one end essentially connected to said vernier shaft, a second linear portion having one end firmly connected to said cam follower, said first and second portions being slidably coactable in a longitudinal relationship whereby angular displacement of said vernier shaft causes predetermined angular displacement of said cam follower affording corresponding displacement of said member effecting vernier tuning of the said elements.

4. A frequency selector comprising a plurality of variable frequency determining elements, a displaceable member suitably coupled with said elements, a tuning shaft, mechanism including a cam secured to said shaft, a vernier tuning shaft, a cam follower co-actable with said cam, means secured to said cam follower and connected to said member for displacing said member in correspondence with linear displacement of said cam follower, and linkage means comprising a rod, a cylinder with a longitudinal base for accommodating said rod, said rod and cylinder being slidably co-actable and secured between said vernier shaft and said cam follower whereby angular displacement of said vernier shaft causes predetermined angular displacement of said cam follower affording corresponding displacement of said member effecting vernier tuning of the said elements.

5. A frequency selector comprising a plurality of variable frequency determining elements, a displaceable member suitably coupled with said elements, a tuning shaft, mechanism including a cam secured to said shaft, a vernier tuning shaft, a cam follower coactable with said cam, means secured to said cam follower and connected to said member for displacing said member in correspondence with linear displacement of said cam follower, and linkage means comprising a slotted member, a linear member slidable in said slotted member and means for constraining said linear member to longitudinal movement with respect to said slotted member, said slotted and linear member being secured between said vernier shaft and said cam follower whereby angular displacement of said vernier shaft causes predetermined angular displacement of said cam follower affording corresponding displacement of said member effecting vernier tuning of the said elements.

6. A frequency selector comprising a plurality of variable frequency determining elements, a displaceable member suitably coupled with said elements, a tuning shaft, mechanism including a cam secured to said shaft, a vernier tuning shaft, a cam follower having a cammed surface coactable with said cam, means secured to said cam follower and connected to said member for displacing said member in correspondence with linear displacement of said cam follower, a spring connected to said cam follower biasing said follower against said cam, and linkage means comprising a slotted member, a linear member containing a ball slidable in said slotted member and means for constraining said linear member to longitudinal movement with respect to said slotted member said slotted and linear members being secured between said vernier shaft and said cam follower whereby angular displacement of said vernier shaft causes predetermined angular displacement of said cam follower affording corresponding displacement of said member effecting vernier tuning of the said elements.

7. A frequency selector comprising a plurality of variable frequency determining elements, a displaceable member suitably coupled with said elements, a tuning shaft, mechanism including a cam secured to said shaft, a vernier tuning shaft, a cam follower coactable with said cam, means secured to said cam follower and connected to said member for displacing said member in correspondence with linear displacement of said cam follower, a linkage means comprising a first and second link, a pin secured to said first link engaging a longitiudinal slot in said second link, said links being secured between said vernier shaft and said cam follower whereby angular displacement of said vernier shaft causes predetermined angular displacement of said cam follower affording corresponding displacement of said member effecting vernier tuning of the said elements.

References Cited in the file of this patent

UNITED STATES PATENTS

| | | |
|---|---|---|
| 1,711,931 | Farrington | May 7, 1929 |
| 1,810,985 | Reichenbach | June 23, 1931 |
| 2,533,810 | Jacob et al. | Dec. 12, 1950 |
| 2,540,824 | Kolks | Feb. 6, 1951 |
| 2,572,964 | Wulfsberg | Oct. 30, 1951 |
| 2,665,377 | Krepps | Jan. 5, 1954 |
| 2,796,519 | Papouschek | June 18, 1957 |